(12) United States Patent
Kakani et al.

(10) Patent No.: US 8,169,909 B2
(45) Date of Patent: May 1, 2012

(54) OPTIMIZATION OF A TRANSFER LAYER PROTOCOL CONNECTION

(75) Inventors: Naveen Kumar Kakani, Irving, TX (US); Shashikant Maheshwari, Irving, TX (US); Miikka Huomo, Vantaa (FI)

(73) Assignee: Nokia Corporation (FI)

( * ) Notice: Subject to any disclaimer, the term of this patent is extended or adjusted under 35 U.S.C. 154(b) by 1303 days.

(21) Appl. No.: 11/345,715

(22) Filed: Feb. 2, 2006

(65) Prior Publication Data
US 2006/0140121 A1   Jun. 29, 2006

Related U.S. Application Data

(63) Continuation-in-part of application No. 11/025,007, filed on Dec. 29, 2004, now abandoned.

(51) Int. Cl.
*G01R 31/08* (2006.01)
(52) U.S. Cl. ........ 370/235; 370/229; 370/230; 370/255; 370/389; 370/395.42
(58) Field of Classification Search .................. 370/229, 370/230, 230.1, 232, 235, 255, 315, 389, 370/395, 21, 42, 401
See application file for complete search history.

(56) References Cited

U.S. PATENT DOCUMENTS

| | | | | |
|---|---|---|---|---|
| 6,105,064 | A * | 8/2000 | Davis et al. | 709/224 |
| 6,208,620 | B1 * | 3/2001 | Sen et al. | 370/231 |
| 6,285,658 | B1 * | 9/2001 | Packer | 370/230 |
| 6,415,329 | B1 * | 7/2002 | Gelman et al. | 709/245 |
| 6,457,051 | B1 * | 9/2002 | Riddle et al. | 709/224 |
| 6,560,231 | B1 * | 5/2003 | Kawakami et al. | 370/395.43 |
| 6,590,885 | B1 * | 7/2003 | Jorgensen | 370/338 |
| 6,646,987 | B1 * | 11/2003 | Qaddoura | 370/231 |
| 6,772,211 | B2 * | 8/2004 | Lu et al. | 709/226 |
| 6,789,050 | B1 * | 9/2004 | Reeser et al. | 703/2 |
| 6,826,620 | B1 * | 11/2004 | Mawhinney et al. | 709/235 |
| 6,904,058 | B2 * | 6/2005 | He et al. | 370/477 |
| 6,961,539 | B2 * | 11/2005 | Schweinhart et al. | 455/12.1 |
| 6,996,062 | B1 * | 2/2006 | Freed et al. | 370/235 |

(Continued)

FOREIGN PATENT DOCUMENTS

WO   WO 0197438   12/2001

OTHER PUBLICATIONS

Dean S.K. Chang, "*IEEE 802.16 Technical Backgrounder*", IEEE 802.16 Broadband Wireless Access Working Group, May 24, 2002.

(Continued)

*Primary Examiner* — Ayaz Sheikh
*Assistant Examiner* — Andrew C Lee
(74) *Attorney, Agent, or Firm* — Alston & Bird LLP

(57) ABSTRACT

In the preferred embodiments, it is first determined whether or not a TCP connection from a sending device to a receiving device in the wireless communications network is in a slow start phase. If the TCP connection is in a slow start phase, then the data to be sent in the TCP connection that is allocated a priority that is higher than the priority allocated to other data to be sent by the sending device. The sending device may be a mobile terminal, a Serving GPRS Support Node (SGSN), a device in a WiMAX environment or other network device, and the method of the preferred embodiments may be implemented by software installed and executed on the network device.

45 Claims, 4 Drawing Sheets

U.S. PATENT DOCUMENTS

| | | | |
|---|---|---|---|
| 7,035,214 B1 | 4/2006 | Seddigh et al. | 370/231 |
| 7,046,678 B2 | 5/2006 | Jiang et al. | 370/395.41 |
| 7,047,312 B1* | 5/2006 | Aweya et al. | 709/235 |
| 7,099,273 B2 | 8/2006 | Ha et al. | 370/229 |
| 7,124,195 B2* | 10/2006 | Roach et al. | 709/232 |
| 7,136,353 B2* | 11/2006 | Ha et al. | 370/230 |
| 7,177,272 B2* | 2/2007 | Swami | 370/229 |
| 7,289,443 B1* | 10/2007 | Costello | 370/231 |
| 7,349,338 B2* | 3/2008 | Balachandran et al. | 370/232 |
| 7,366,498 B2 | 4/2008 | Ko et al. | |
| 7,369,498 B1* | 5/2008 | Ma et al. | 370/235 |
| 7,385,986 B2* | 6/2008 | Ono et al. | 370/395.4 |
| 7,656,799 B2* | 2/2010 | Samuels et al. | 370/231 |
| 7,664,017 B2* | 2/2010 | Sagfors | 370/230 |
| 2001/0015956 A1* | 8/2001 | Ono | 370/229 |
| 2001/0016878 A1* | 8/2001 | Yamanaka | 709/234 |
| 2002/0004842 A1* | 1/2002 | Ghose et al. | 709/235 |
| 2002/0044527 A1 | 4/2002 | Jiang et al. | 370/229 |
| 2002/0150048 A1* | 10/2002 | Ha et al. | 370/231 |
| 2003/0063564 A1* | 4/2003 | Ha et al. | 370/230 |
| 2003/0112802 A1 | 6/2003 | Ono et al. | |
| 2003/0189896 A1* | 10/2003 | Dang et al. | 370/217 |
| 2005/0002412 A1* | 1/2005 | Sagfors et al. | 370/437 |
| 2005/0013245 A1* | 1/2005 | Sreemanthula et al. | 370/229 |
| 2005/0083850 A1* | 4/2005 | Sin et al. | 370/252 |
| 2005/0135248 A1* | 6/2005 | Ahuja et al. | 370/235 |
| 2005/0210122 A1* | 9/2005 | Taylor et al. | 709/218 |
| 2005/0220097 A1* | 10/2005 | Swami et al. | 370/389 |
| 2005/0232180 A1* | 10/2005 | Toporek et al. | 370/316 |
| 2005/0251403 A1* | 11/2005 | Shuey | 705/1 |
| 2005/0262266 A1* | 11/2005 | Wiberg et al. | 709/238 |
| 2006/0045117 A1* | 3/2006 | Qi et al. | 370/445 |
| 2006/0156164 A1* | 7/2006 | Meyer et al. | 714/749 |
| 2007/0280115 A1* | 12/2007 | Meyer et al. | 370/236 |

OTHER PUBLICATIONS

WiMAX Forum—Technical Overview, *"Promoting Interoperability Standards for Broadband Wireless Access"*, www.wimaxforum.org/technology/tech_overview, downloaded Dec. 5, 2005.

Carl Eklund et al., *"IEEE Stand 802.16: A Technical Overview of the WirelessMan™ Air interface for Broadband Wireless Access"*, IEEE Communications Magazine, Jun. 2002.

Ohsaki et al., *"On modeling GridFTP using fluid-flow approximation for high speed grid networking"*, Jan. 26-30, 2004, IEEE.

Office Action for Chinese Application No. 200580048086.4 dated Jun. 23, 2010.

Office Action for U.S. Appl. No. 11/025,007 mailed Mar. 27, 2009.

\* cited by examiner

OPTIMIZATION OF A TRANSFER LAYER PROTOCOL CONNECTION

RELATED APPLICATION

This application claims priority to U.S. patent application Ser. No. 11/025,007, filed Dec. 29, 2004 now abandoned, which is incorporated herein by reference in its entirety.

FIELD OF THE INVENTION

The invention relates to data transmission in a wireless and/or wireline communications network. In particular, the invention relates to improvements in the throughput of a TCP connection in a wireless network and/or wireline network where data buffers are maintained.

BACKGROUND OF THE RELATED ART

The Transmission Control Protocol (TCP) is the predominant transfer layer protocol used in Internet Protocol (IP) data transmissions. A sending device utilizing TCP retransmits data unless it receives an acknowledgment from the receiving device that the data successfully arrived at the receiving device. TCP also utilizes a handshake to establish the logical end-to-end connection between the communicating devices and views data as a continuous stream. It therefore maintains the sequence in which bytes/octets are sent and received to facilitate this byte-stream characteristic.

TCP uses a slow start process whenever a connection is started or a timeout occurs. It starts with a small data rate to make sure that the connection can accommodate at least a very little amount of data. This is done in order to avoid network congestion. TCP then relies on the rate of arrival of acknowledgement messages to gradually increase its data rate. After sending a window of data, the sending device needs to wait for one round trip time (RTT) before it receives any acknowledgement. Due to large value of RTT, the TCP sending device waits for a long time in slow start phase before it reaches a reasonable throughput.

But in a wireless network, the transmission characteristics of connections can change frequently. The transmission characteristics can change due to movement of a mobile terminal, especially when the receiving device moves from a first cell to a second cell in a cellular based network. Also, the bandwidth in the wireless network is limited and this limited bandwidth is shared among multiple users, and a high bit error rate (or even a lost connection in some circumstances), resulting in a long round trip time (RTT) for the connection (or even timeouts) that require the slow start process to begin again. This means that the rate at which acknowledgement messages are received is very slow. Also, in the network, all the packets for connections which are in slow start phase are queued along with all the other connections. This means that the RTT during slow start has a strong component of the queuing delay coming from other connections.

Several attempts have been made to either increase the data rate at the start of the connection or to reduce RTT of a connection. However, after the slow start phase if the TCP connection has to face the real network conditions (queuing delay, etc) the benefits of expedited slow start are lost and the performance of the connection may not be as good as it is expected to be.

BRIEF SUMMARY

Briefly, and in general terms, the preferred and exemplary embodiments of the invention resolve the above and other problems in the slow start phase time for the TCP connection in a wireless network. In a first aspect of the preferred embodiments, it is first determined whether or not a TCP connection from a sending device to a receiving device in the wireless communications network is in a slow start phase. If the TCP connection is in a slow start phase, then allocating priority in the sending device to the data to be sent in the TCP connection that is higher than the priority allocated to other data to be sent by the sending device. The sending device may be a mobile terminal, a Serving GPRS Support Node (SGSN), a device in a WiMAX environment or other network device, and the method of the preferred embodiments may be implemented by software installed and executed on the network device.

DETAILED DESCRIPTION OF THE PREFERRED EMBODIMENTS

Several preferred embodiments of the invention are now described. The preferred embodiments improve the performance of a TCP connection in a wireless network by speeding up the slow start phase and gradually improving the RTT of the TCP connection to match conditions in the network at the same time. The preferred embodiments reduce the slow start phase time for the TCP connection by servicing data of the connection quickly by giving it the highest priority (higher priority packets are serviced/transmitted before lower priority packets), and at the same time it gradually decreases the priority of the TCP connection data, based on the amount of data being sent for that connection. By gradually decreasing the priority, the RTT is also gradually increased (based on queuing in the network) and this results in a smooth increase in the RTO value of the connection. The preferred embodiments will hereinafter be described with reference to particular network environments, but the invention is not limited to the following preferred embodiments and may be practiced in other embodiments as well.

Figure 1:
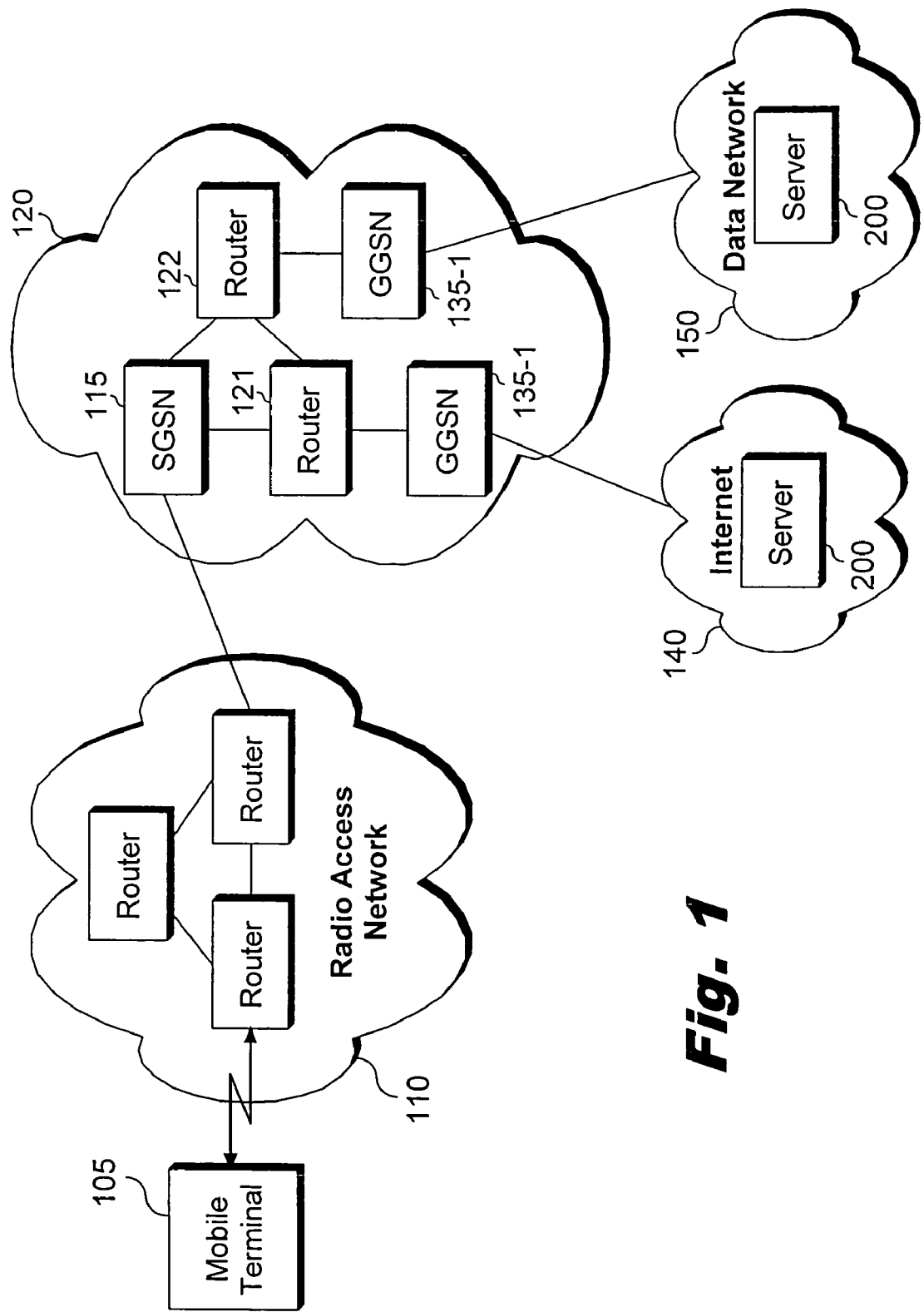
FIG. 1 illustrates an exemplary network in which the preferred embodiments of the invention may operate.

The preferred embodiments may be practiced with reference to an exemplary wireless network shown in FIG. 1. As shown in the figure, wireless network 100 includes mobile terminal 105, radio access network (RAN) 110 with routers 111-113, SGSN 115, core network 120 with routers 121 and 122, Gateway GPRS Service Nodes (GGSNs) 135-1 and 135-1, Internet 140, and data network 150. Mobile terminal 105 is coupled to radio access network (RAN) 110, and may include any device capable of connecting to a wireless network such as radio access network 110. Such mobile terminals include cellular telephones, smart phones, pagers, radio frequency (RF) devices, infrared (IR) devices, integrated devices combining one or more of the preceding devices, and the like. Mobile terminal 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and permits users to access core network 120. Radio access network 110 transports information to and from devices capable of wireless communication, such as mobile terminal 105.

Radio access network 110 may include both wireless and wired telecommunication components. For example, radio access network 110 may include cellular towers, base stations, and/or base station controllers (not shown). Typically, the base stations carry wireless communication to and from cell phones, pagers, and other wireless devices, and the base station controllers carries communication to core network 120 for subsequent connection to landline phones, long-distance communication links, and the like. The wireless communication with the base station may be carried out according to any one of a number of different known cellular communication standards or broadband wireless data standards, such as the so-called WirelessMAN or WiMAX technology developed by the Institute of Electrical and Electronics Engineers (IEEE) in their 802.16 family of standards. As one particular example, the mobile standard in IEEE 802.16e has recently been approved.

As shown in the figure, RAN 110 includes routers 111-113 that receive transmitted messages and forwards them to their correct destinations over available routes. The routers may be a complex computing device including memory, processors, and network interface units. The routers 121 and 122 may be configured as an internal router for a base station controller and calculate their communication loads as well as the communication loads relating to other base station controllers. The routers may send a warning message to other routers within the network when its load exceeds a configurable threshold. One or more of routers 121 and 122 may be coupled to a wired telecommunication network and in communication with wireless devices such as mobile node 105.

Core network 120 is an IP packet based backbone network that includes routers, such as routers 121-122. In a cellular environment, some nodes may be General Packet Radio Service (GPRS) nodes. For example, Serving GPRS Support Node (SGSN) 115 may send and receive data from mobile stations, such as mobile node 105, over RAN 110. SGSN 115 also maintains location information relating to mobile node 105. SGSN 115 communicates between mobile node 105 and Gateway GPRS Support Node (GGSN)s 135-1 through routers 121 and 122. GGSNs 135-1 are coupled to routers 121 and 122, and act as gateways to external data networks, such as Internet 140 and network 150. Networks 140 and 150 may be the public Internet or a private data network. GGSNs 135-1 allow mobile node 105 to access networks 140 and 150. In another environment, such as one including WiMAX wireless connections, core network 120 may alternatively or supplementally include other network devices appropriate for that environment.

Furthermore, computers and other network devices, such as servers 200, may be connected to network 140 and network 150. Although not shown in FIG. 1, there may be one or more routers between core network 120 and a server 200. The public Internet itself may be formed from a vast number of such interconnected networks, computers, and routers. Radio access network 110 and core network 120 may include many more components than those shown in FIG. 1. However, the components shown are sufficient to disclose an illustrative embodiment for practicing the present invention.

Figure 2:
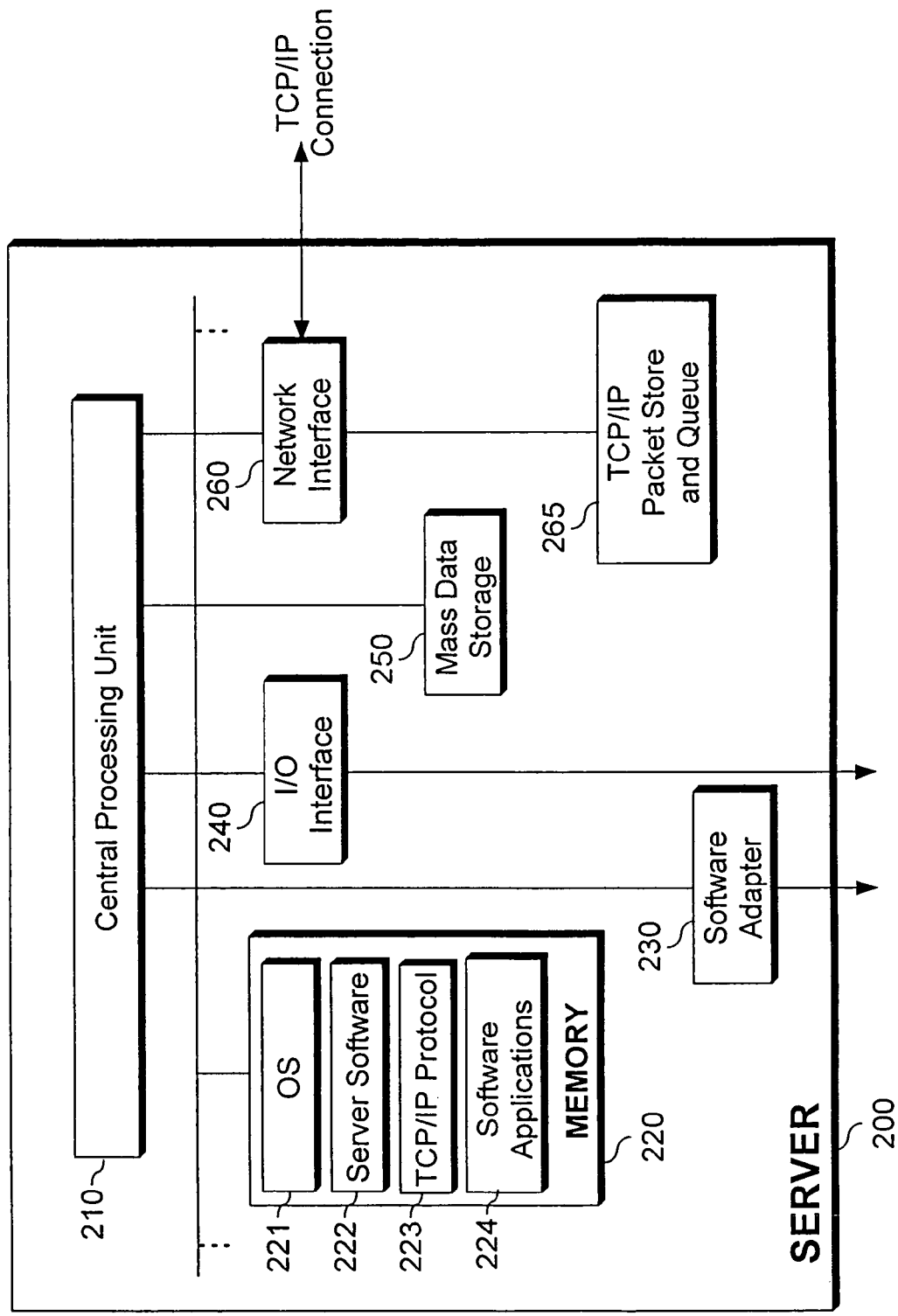
FIG. 2 illustrates an exemplary server that can operate as a sending device or a receiving device for a TCP connection.

FIG. 2 illustrates an exemplary server computer 200, such as a World Wide Web (WWW) server, that is operative as either a sending device or receiving device for data packets in Internet 140 or network 150. Accordingly, server 200 can employ TCP/IP protocols to transmit content to a browser on a requesting device such as a mobile terminal node. For instance, server 200 may transmit data packets for pages, forms, streaming media, voice and the like, over the Internet, or some other communications network.

Server computer 200 may include many more components than those shown in FIG. 2. However, the components shown are sufficient to disclose an illustrative embodiment for practicing the present invention. Server computer 200 is connected to a communications network, via network interface unit 260 which may be used with various communication protocols including, but not limited to, TCP/IP protocol 223 stored in memory 220 and the TCP/IP packet store and queue 265. Memory may store applications such as a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with external security applications (not shown), to send and receive private information in a secure fashion.

Server computer 200 also includes central processing unit 210, video display adapter 230, and mass memory 220, all connected via a central bus 222. The server generally includes an I/O interface 240 for communicating with external devices, such as a mouse, keyboard, scanner, and the like, and one or more permanent mass storage devices 250. The mass memory stores operating system 221 for controlling the operation of server computer 200, server software 222 and other software applications 224. It will be appreciated that OS 221 may comprise a general purpose server operating system as is known to those of ordinary skill in the art, such as UNIX, LINUX, or Microsoft WINDOWS.

Figure 3:
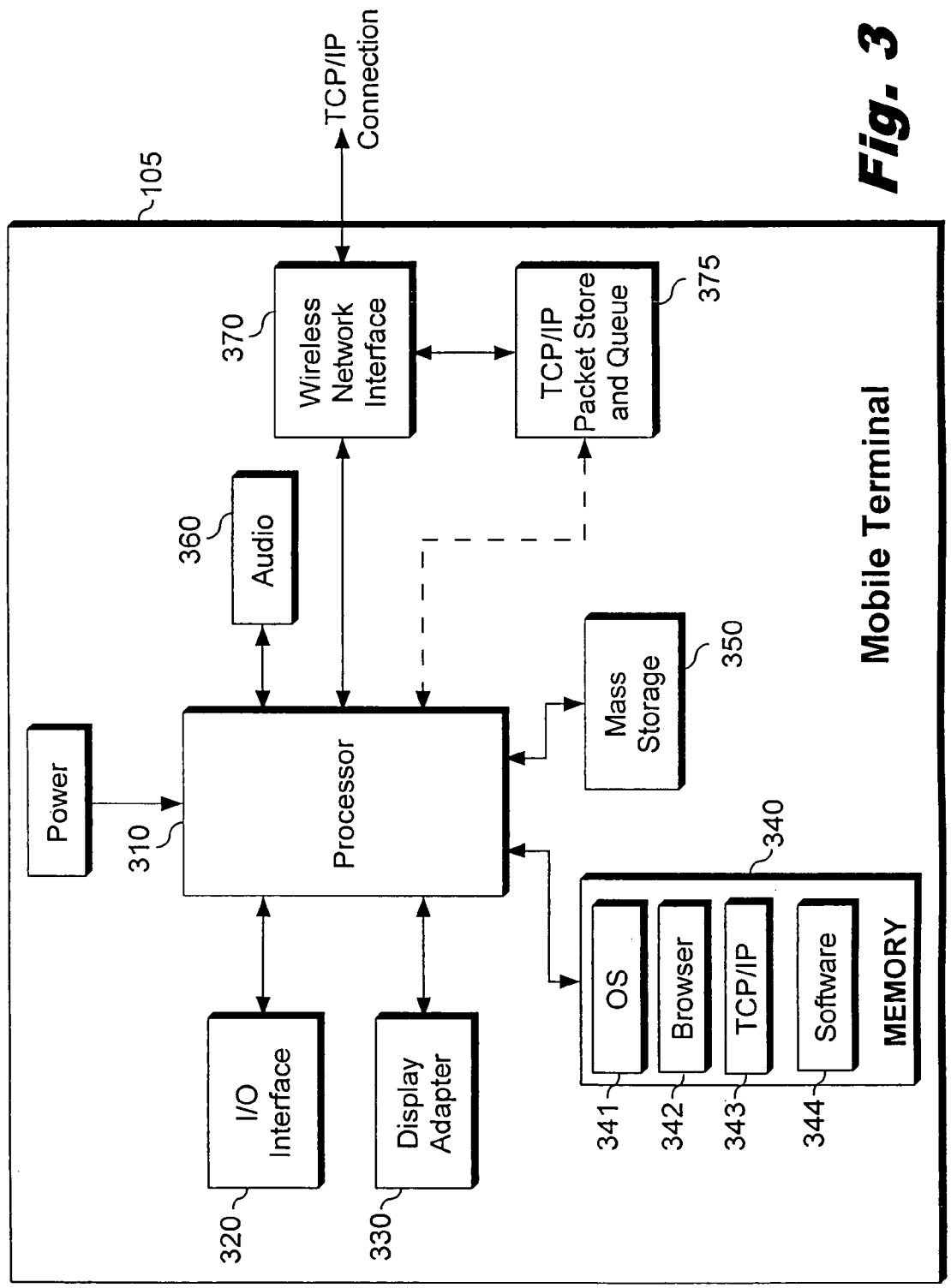
FIG. 3 illustrates an exemplary mobile terminal that can operate as a sending device or a receiving device for a TCP connection.

FIG. 3 shows an exemplary mobile terminal 300. Mobile terminal 300 may be arranged to transmit and receive data packets in a TCP/IP connection. For instance, it may send and receive packets with other mobile nodes, SGSN 115 (in a GPRS environment) or other device in core network 120, and various servers such as server 200. The communication of packets may take place, in whole or in part, over a mobile network, Local Area Network (LAN), Metropolitan Area Network (MAN), Wide Area Network (WAN), Internet, and the like. In some environments, the mobile terminal may be referred to as a mobile station or a subscriber station.

Mobile terminal 105 may include many more components than those shown in FIG. 3. However, the components shown are sufficient to disclose an illustrative embodiment for practicing the present invention. As shown in the figure, mobile terminal 300 includes processing unit 310, input/output interface 320 for communicating with external devices, such as headsets, keyboards, pointers, controllers, modems, and the like, display adapter 330 and memory 340 including operating system 341 for controlling the operation of mobile terminal 105, browser 342 to receive web pages, TCP/IP protocol stack 343, and other software applications 344 which, when executed by mobile terminal 105, transmits and receives e-mail, voice, text messages, streaming audio, video, and the like. One or more of such software applications may run under control of operating system 340. Mobile terminal 105 may also include a ROM used to store data that is not lost when the mobile node loses power or is turned off. The memory 340 may be any suitable configuration of computer-readable storage media, such as volatile and nonvolatile, removable and non-removable media implemented in any method or technology for storage of information, such as computer readable instructions, data structures, program modules or other data. Examples of such computer storage media include RAM, ROM, EEPROM, flash memory cards or other memory technology.

There is also various mass storage 350 and audio circuitry 360 arranged to receive and produce sounds, i.e., audio signals. For example, audio interface 354 may be coupled to a speaker and microphone (not shown) to enable audio communication for a telephone call. Mass data storage 350 is utilized by mobile terminal 300 to store, among other things, applications, databases and large data files. Mass storage 350 may comprise flash memory, mini hard disk drives, CD-ROM, digital versatile disks (DVD) or other optical storage, magnetic cassettes, magnetic tape, magnetic disk storage or other magnetic storage devices, or any other medium which can be used to store the desired information and which can be accessed by mobile terminal 105.

Mobile terminal 105 connects to the radio access network 110 via wireless network interface 370, which is configured for use with various communication protocols including TCP/IP protocol 343, to perform various applications such as web browsing, emails, chat session, messaging, etc. Wireless network interface 370 may include a physical radio layer (not shown) that is arranged to transmit and receive certain radio frequency communications. Wireless network interface 370 connects mobile terminal 105 to network devices in external networks, via a communications carrier or service provider.

The preferred embodiments can be implemented in either a server 200, a SGSN 215 (in a GPRS environment) or other device in core network 120, an intermediate router or mobile terminal 105 as a sending device in a TCP connection. These devices may also be configured to operate as a receiving device in a TCP connection. In particular, the preferred embodiments can be performed even when there are multiple TCP connections. The priority of data to be sent during the slow start phase in the TCP connection may be adjusted, for example, in a TCP/IP packet store and queue utilized by a network interface.

When it is determined that a TCP connection is in a slow start phase, a table or other monitoring procedure is created and maintained that tracks the data that was sent in the TCP connection. As known, each TCP connection is identified when setting up the TCP connection (SYN/SYNACK/ACK) or when new endpoints are received and size of packet received and a corresponding entry in a transfer log is created. If the number of bytes sent for a particular connection is less than a predetermined parameter "Xmax", then the connection is considered to be in a slow start phase. The parameter Xmax is chosen such that the time taken to send Xmax amount of data is sufficient enough for the TCP connection to fully adapt to the conditions of the network and exit from the slow start phase. As an example, Xmax may be set to equal K*MIN_BUF where MIN_BUF is the minimum buffer length in the route from the sending device to the receiving device and K is a predetermined system parameter. The value of K can be set by the network operator or provider of the communication service corresponding to the TCP connection (the TCP window Size can never be greater than the MIN_BUF).

Each packet of data in the slow start phase is allocated a priority value that is stored in the table and determines when the data is sent. The priority value allocated to data sent in the slow start phase of a TCP connection depends upon the amount of data already sent for the connection. For example, if $X_i$ amount of data has already been sent in the TCP connection, then the priority value for the next data packet to be sent in that TCP connection is based on $X=X_i/X_{max}$.

Preferably, the priority value allocated to a TCP data packet is constrained to be between 0 and 1. Thus, even in cases where the amount of data is greater than Xmax, then the value of X will be set to 1 and correspondingly priority value is also set to 1. Alternatively, when the value of X reaches 1, the allocated priority value can be removed from the table. The priority for sending data is gradually increased in accordance with a plurality of tiers. There may be four tiers, for example, X1, X2, X3 and X4, where priority of tier X1 applies when the value of X is between 0 and 0.25, tier X2 applies when the value of X is between 0.26 and 0.50, tier X3 applies when the value of X is between 0.51 and 0.75, and tier X4 applies when the value of X is between 0.76 and 1 or higher. Of course, there may be different number of tiers with different ranges along with different priorities allocated to each different tier.

The different priorities of data in the slow start phase can be applied in any number of ways. As a first example, the method is implemented in a sending device, such as a Serving GPRS Support Node (SGSN), Gateway GPRS Support Node (GGSN), router or a device in a Radio Access Network (RAN) that is capable of supporting multiple queues for Quality of Service (QoS) classes for a user like Diffserv in a wireline network. Although the general architecture of a SGSN, GGSN or router is not shown in the drawings, such devices also have a processor, memory, network interface and TCP/IP packet store and queue. Well known in the art, QoS classes can be applied according to the subscriber status of a user in a network or according to the requirements of various communication services of a user. For example, a real-time audio, video or interactive service may have a high QoS class whereas an email service may have a low QoS class, sometimes referred to as a "best efforts" class. The data for each QoS class may be placed into a unique logical or physical buffer queue dedicated to that QoS class. In such instances, the data in the buffer of a high QoS class may be sent before data in a low QoS class even though that data was arrived later in time than the data in the lower QoS class.

Figure 4:
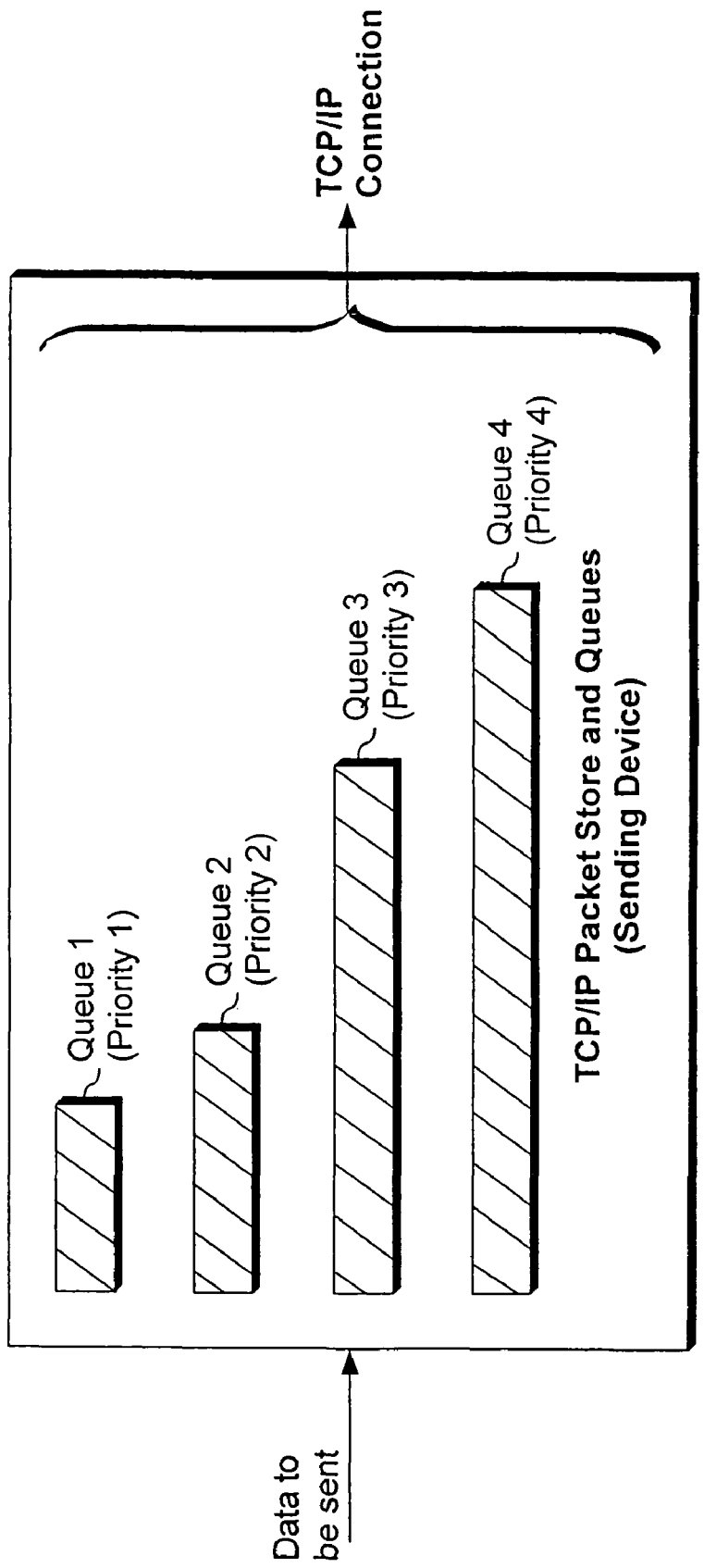
FIG. 4 is a diagram illustrating the placement of data in a plurality of queues having different respective priorities in accordance with a preferred embodiment of the invention.

The priority allocated for the data in the slow start phase is utilized according to the method described above to place the data in an appropriate Quality of Service (QoS) class and buffer queues. If the X values and corresponding priorities are divided into tiers as described above, then the tiers can be mapped to respective QoS classes. This approach is illustrated in FIG. 4, which shows the respective buffer queues for four different QoS classes and each QoS class having a respective priority. All SYN/ACK (here ACK means pure ACK, with no piggybacked data) packets may be considered as belonging to the highest priority tier between 0 and 0.25.

For example, if the value of X is in the X1 tier, then the data packet will be stored in the buffer of queue 1 (priority 1). If the value of X is in the range of X2, then the data packet will be stored in the buffer of queue 2 (priority 2), and so on for all priority values and tiers. While there are many different possible QoS configurations, this approach has the advantage that it simplifies the modification of priorities allocated to different data packets by leveraging the existing logic and support for QoS classes in a sending device.

In a variation of this implementation, multiple queues (child queues) with different weights are implemented under each QoS Class. The data from the lowest priority queue is serviced first and higher weights within a QoS class are assigned to the data packets in a TCP connection in the slow start phase. A child queue is selected based on the allocated priority of a data packet and the weight of the child queue. The higher the weight of the child queue, then the lower the priority. However, the priority of highest weighted child queue in the particular QoS Class is higher than priority of lowest weighted child queue in the next higher QoS Class. Multiple child queues with different weights like W1, W2, W3 and W4 where W1<W2<W3<W4 are assumed in the parent QoS Class. The lower priority queue is serviced first, and may include SYN/ACK packets.

For the slow start phase, the value of X may be mapped to an appropriate tier and sub-tier. The data packets in the slow start phases will be assigned a QoS class buffer queue and child queue within the QoS class according to the X priority value. Thus, there may be sixteen different child queues and priority values allocated. This implementation has the advantage of leveraging existing support for QoS classes, but provides a finer degree of accuracy in implementing various priorities.

Unfortunately, some types of equipment may not be able to easily implement this embodiment. For example, in the WiMAX standard, differentiated QoS is provided by appropriate features in the medium access control (MAC) layer. These features include a MAC scheduler with queues of frames based on QoS. Using such features to accommodate QoS in the MAC layer is more efficient than doing so in layers of control overlaid on the MAC, but the queues in the MAC layer cannot be controlled in the manner described above. The WiMAX protocol stack does include a convergence sublayer above the MAC layer that would be appropriate, but the standard does not require that there be manageable queues in the convergence sublayer. Thus, in one embodiment of the invention applied in a WiMax environment, a sending device would be provided with manageable queues in the convergence sublayer controlled in the manner described above. However, while it may be preferable to simply utilize such a sending device, it may also be necessary to implement an embodiment of the invention in other WiMAX sending devices that do not have such manageable queues in the convergence sublayer.

Applicants have developed the two following embodiments, which may be implemented in a WiMAX environment by utilizing the convergence sublayer. The convergence sublayer sees packet headers, such as TCP/IP and RTP headers, and uses classifiers to map a packet data service to a multi-bit connection identifier (CID). A mobile terminal and a base station set up a connection with a CID and classification rules using a Dynamic Service Association (DSA) procedure. The classification rules can be defined on parameters such as source and destination IP addresses, etc. The DSA procedure also allocates Service Flow (QoS) parameters to a CID. Traffic priority is one of the service flow parameters. The traffic scheduler resides in the MAC layer.

In the first of these two embodiments, a separate high priority CID/CID's are used for transporting TCP packets during the slow start process. The high priority is associated to the CID by setting traffic priority higher than the assigned traffic priority of the TCP connection. After realizing a service connection for TCP, the convergence sublayer in the base station initiates the DSA procedure. It allocates a high traffic priority and sends the associated CID to the mobile terminal. These CID(s) are only used during slow start to override the already established priority for the TCP connection. Priority is gradually increased by holding the packet in the convergence sublayer using the Xi/Xmax ratio as criteria before delivering it to the MAC layer. While there is signaling overhead due to the additional DSA procedure for each TCP connection, this embodiment does not require WiMax equipment with manageable queues in the convergence sublayer and is not inconsistent with the WiMax standard.

In the second of these two embodiments, the convergence sublayer delivers the TCP packet and CID to the MAC layer through MAC SAP using a primitive. The convergence sublayer detects the slow start condition, and marks the packet for priority treatment by sending override_priority parameter with the primitive to the MAC layer. The MAC scheduler uses the override_priority parameter instead of the traffic priority associated with the CID. Priority can be gradually increased by holding the packet in the convergence sublayer using the Xi/Xmax ratio as criteria before delivering it to the MAC layer or by changing the override_priority parameter with each packet using the Xi/Xmax ratio. While this embodiment does not have any signalling overhead as in the previous embodiment the extra parameter introduces extra complexity for the scheduler.

A further embodiment of the invention can work in cases where no QoS is implemented in a particular network node serving as the sending device. In this different embodiment, rather than using QoS classes with respective queues for the QoS classes, the network interface calculates and assigns respective service times to the different X priority values of data packets. The calculated service times may be based on the SGSN/MS/PDP context/TCP flow. In particular, rather than simply placing the data packet into different queues or child buffer queues based on priority value, the network interface uses the computation of service time based upon the queue length in the transmission buffer to determine the time by which the new packet needs to be sent. The transmission buffer may be a simple first-in first-out (FIFO) buffer. The function can be expressed as FI (Service Time)=Current System Time+f(queue_length (Q), Service Rate (R)). This function allocates the service time for the new packet based upon the time it would take to send Q amount of data (that is already queued in the system). To be able to send the new packets for the TCP Connection (i) earlier than the existing packets in the system, the function FI should use a lower value of Q to reflect the priority allocated to the new packet hence, FI=Current System Time+f(P(i)*Q) where P(i)=Xi/Xmax.

Q could be the amount of data for a particular type of traffic (for example: a PDP Context), or it could be the total queue length in the network device (e.g., SGSN). The above computation of FI can be used to increase or decrease the service time of data of any type by simply changing the computation of P(i): For example, If RTP packets are to be serviced earlier than TCP packets then P(i) for RTP connections is always lower than the parameter used for TCP connections. This embodiment does not leverage and rely upon the different QoS classes, but it has the advantage that the time in which a data packet in a slow start phase can be more directly (and accurately) controlled and that only a single FIFO buffer is used instead of multiple queues.

The preferred embodiments have numerous advantages over the prior art. They can be used across all traffic types since priority is individually allocated to different packets. Within a TCP connection, some packet types can be serviced earlier than other packet types (e.g., within a TCP Connection: P(i) for all ACK and or SYN packets can be set to '0' and for the rest of the packets, the function Xi/Xmax can be used). While certain information of the TCP connection needs to be maintained, this information needs to be maintained in slow start only. Hence, the method is scalable because it does not require memory as a function of the total number of TCP connections supported. Interactive traffic applications (with small amounts of data) can be speeded up and interactive traffic may maintain a single TCP connection. The method can be applied regardless of the direction of the TCP connection.

It will be apparent from the foregoing that, while preferred and exemplary embodiments have been illustrated and described, various modifications can be made without departing from the spirit and scope of the invention. Accordingly, it is not intended that the invention be limited by the detailed description of the preferred and exemplary embodiments.

The invention claimed is:

1. A method comprising:
determining whether a transfer layer protocol connection from a sending device to a receiving device is in a slow start phase; and
in an instance in which the transfer layer protocol connection is in a slow start phase, then allocating priority in the sending device to data to be sent in the transfer layer protocol connection that is higher than the priority allocated to other data to be sent by the sending device, wherein the priority of the data to be sent in the transfer layer protocol connection is allocated based at least in part upon an amount of data sent for the transfer layer protocol connection and a predetermined amount of data sufficient for the transfer layer protocol connection to adapt to network conditions.

2. The method recited in claim 1, wherein the priority of the data to be sent in the transfer layer protocol connection is gradually decreased.

3. The method recited in claim 2, wherein the priority of the data to be sent in the transfer layer protocol connection is gradually decreased based on the amount of data sent for the transfer layer protocol connection.

4. The method recited in claim 3, wherein the priority of the data to be sent in the transfer layer protocol connection is determined according to the equation X=Xi/Xmax, where Xi is the amount of data sent in the slow start phase of the transfer layer protocol connection and Xmax is a predetermined amount of data sufficient for the transfer layer protocol connection to adapt to network conditions and X has a maximum value of '1'.

5. The method recited in claim 4, wherein the value of X is divided into a plurality of different tiers and a unique priority is assigned to each one of the plurality of tiers.

6. The method recited in claim 2, wherein the priority comprises a quality of service (QoS) class.

7. The method recited in claim 6, wherein higher weights within a QoS are assigned to data being sent in a slow start phase of the transfer layer protocol connection.

8. The method recited in claim 2, wherein a service time is assigned to the data to be sent in the transfer layer protocol connection based on the priority.

9. The method recited in claim 1, wherein the transfer layer protocol connection from the sending device to the receiving device comprises a transfer layer protocol connection over a wireless communication network, and wherein the wireless communication network utilizes a Worldwide Interoperability for Microwave Access (WiMAX) wireless connection between the sending device and receiving device.

10. The method recited in claim 9, wherein the data to be sent in the transfer layer protocol connection is allocated a higher priority by setting up and/or using multiple connections that are used only during the slow start phase and have a higher priority than the transfer layer protocol connection.

11. The method recited in claim 10, wherein the data to be sent in the transfer layer protocol connection is allocated a higher priority by causing a parameter to be sent with a primitive from the convergence sublayer to a traffic scheduler in the Medium Access Control (MAC) layer.

12. The method recited in claim 1, wherein allocating priority in the sending device to data to be sent in the transfer layer protocol connection comprises allocating priority in response to determining that the transfer layer protocol connection is in a slow start phase.

13. An apparatus, comprising at least one processor and at least one memory storing computer program code, wherein the at least one memory and stored computer program code are configured, with the at least one processor, to cause the apparatus to at least:
cause data to be sent over a transfer layer protocol connection to a receiving device;
determine whether the transfer layer protocol connection is in a slow start phase; and
in an instance in which the transfer layer protocol connection is in a slow start phase, then allocate priority to data to be sent in the transfer layer protocol connection that is higher than the priority allocated to other data to be sent, wherein the priority of the data to be sent in the transfer layer protocol connection is allocated based at least in part upon an amount of data sent for the transfer layer protocol connection and a predetermined amount of data sufficient for the transfer layer protocol connection to adapt to network conditions.

14. The apparatus of claim 13, wherein the priority of the data to be sent in the transfer layer protocol connection is gradually decreased.

15. The apparatus of claim 14, wherein the priority of the data to be sent in the transfer layer protocol connection is gradually decreased based on the amount of data sent for the transfer layer protocol connection.

16. The apparatus of claim 15, wherein the priority of the data to be sent in the transfer layer protocol connection is determined according to the equation X=Xi/Xmax, where Xi is the amount of data sent in the slow start phase of the transfer layer protocol connection and Xmax is a predetermined amount of data sufficient for the transfer layer protocol connection to adapt to network conditions and X has a maximum value of '1'.

17. The apparatus of claim 16, wherein the value of X is divided into a plurality of different tiers and a unique priority is assigned to each one of the plurality of tiers.

18. The apparatus of claim 14, wherein the priority comprises a quality of service (QoS) class.

19. The apparatus of claim 18, wherein higher weights within a QoS are assigned to data being sent in a slow start phase of the transfer layer protocol connection.

20. The apparatus of claim 14, wherein a service time is assigned to the data to be sent in the transfer layer protocol connection based on the priority.

21. The apparatus of claim 13, wherein the apparatus is a Serving General Packet Radio Service (GPRS) Support Node.

22. The apparatus of claim 13, wherein the at least one processor is configured to execute communications software, wherein the communications software comprises a Worldwide Interoperability for Microwave Access (WiMAX) protocol stack.

23. The apparatus of claim 22, wherein the convergence sublayer in the WiMAX protocol stack includes manageable queues which may be controlled to allocate a higher priority to the data to be sent in the transfer layer protocol connection.

24. The apparatus of claim 22, wherein the data to be sent in the transfer layer protocol connection is allocated a higher priority by setting up and/or using multiple connections during the slow start phase and has higher priority than the connection that was set up for the transfer layer protocol connection.

25. The apparatus of claim 22, wherein the data to be sent in the transfer layer protocol connection is allocated a higher priority by causing a parameter to be sent with a primitive from the convergence sublayer to a traffic scheduler in the Medium Access Control (MAC) layer.

26. The apparatus of claim 13, wherein the apparatus is also configured to perform as a receiving device.

27. A computer program product comprising at least one non-transitory computer-readable storage medium having computer-readable program instructions stored thereon, which, when performed by a sending device, cause the sending device to carry out a method comprising:
    determining whether a transfer layer protocol connection from the sending device to a receiving device is in a slow start phase; and
    in an instance in which the transfer layer protocol connection is in a slow start phase, then allocating priority in the sending device to data to be sent in the transfer layer protocol connection that is higher than the priority allocated to other data to be sent by the sending device, wherein the priority of the data to be sent in the transfer layer protocol connection is allocated based at least in part upon an amount of data sent for the transfer layer protocol connection and a predetermined amount of data sufficient for the transfer layer protocol connection to adapt to network conditions.

28. The computer program product recited in claim 27, wherein the priority of the data to be sent in the transfer layer protocol connection is gradually decreased.

29. The computer program product recited in claim 28, wherein the priority of the data to be sent in the transfer layer protocol connection is gradually decreased based on the amount of data sent for the transfer layer protocol connection.

30. The computer program product recited in claim 29, wherein the priority of the data to be sent in the transfer layer protocol connection is determined according to the equation $X=Xi/Xmax$, where Xi is the amount of data sent in the slow start phase of the transfer layer protocol connection and Xmax is a predetermined amount of data sufficient for the transfer layer protocol connection to adapt to network conditions and X has a maximum value of '1'.

31. The computer program product recited in claim 30, wherein the value of X is divided into a plurality of different tiers and a unique priority is assigned to each one of the plurality of tiers.

32. The computer program product recited in claim 28, wherein the priority comprises a quality of service (QoS) class.

33. The computer program product recited in claim 32, wherein higher weights within a QoS are assigned to data being sent in a slow start phase of the transfer layer protocol connection.

34. The computer program product recited in claim 28, wherein a service time is assigned to the data to be sent in the transfer layer protocol connection based on the priority.

35. The computer program product recited in claim 27, wherein the transfer layer protocol connection from the sending device to the receiving device comprises a transfer layer protocol connection over a wireless communication network, and wherein the sending device utilizes a Worldwide Interoperability for Microwave Access (WiMAX) wireless connection on the wireless communication network.

36. The computer program product recited in claim 35, wherein the data to be sent in the transfer layer protocol connection is allocated a higher priority by setting up and/or using multiple connections only during the slow start phase and have higher priority than the transfer layer protocol connection.

37. The computer program product recited in claim 35, wherein the data to be sent in the transfer layer protocol connection is allocated a higher priority by causing a parameter to be sent with a primitive from the convergence sublayer to a traffic scheduler in the Medium Access Control (MAC) layer.

38. A communications network comprising:
    a sending device configured to send data in a transfer layer protocol connection to other devices in said communications network; and
    a receiving device, said receiving device configured to receive data in a transfer layer protocol connection,
    wherein it is determined whether the transfer layer protocol connection is in a slow start phase, and in an instance in which the transfer layer protocol connection is in a slow start phase, then allocating priority in the sending device to data to be sent in the transfer layer protocol connection that is higher than the priority allocated to other data to be sent by the sending device, wherein the priority of the data to be sent in the transfer layer protocol connection is allocated based at least in part upon an amount of data sent for the transfer layer protocol connection and a predetermined amount of data sufficient for the transfer layer protocol connection to adapt to network conditions.

39. The communications network recited in claim 38, wherein the priority of data to be sent in the transfer layer protocol connection is gradually decreased.

40. The communications network recited in claim 39, wherein the priority of the data to be sent in the transfer layer protocol connection is gradually decreased based on the amount of data sent for the transfer layer protocol connection.

41. The communications network recited in claim 38, wherein the sending device comprises a Serving General Packet Radio Service (GPRS) Support Node.

42. The communications network recited in claim 38, wherein the sending device is also configured to perform as a receiving device.

43. The communications network recited in claim 38, wherein the communications network comprises a wireless communications network, and wherein the sending device utilizes a Worldwide Interoperability for Microwave Access (WiMAX) wireless connection on the wireless communication network.

44. The communications network recited in claim 43, wherein the data to be sent in the transfer layer protocol connection is allocated a higher priority by setting up and/or using multiple connections that are used only during the slow start phase and have higher priority than the connection set up for the transfer layer protocol connection.

45. The communications network recited in claim 43, wherein the data to be sent in the transfer layer protocol connection is allocated a higher priority by causing a parameter to be sent with a primitive from the convergence sublayer to a traffic scheduler in the Medium Access Control (MAC) layer.

* * * * *